March 27, 1934.    A. DREYER    1,952,239

PROCESS AND APPARATUS FOR THE MANUFACTURE OF CORRUGATED TUBES

Filed Jan. 10, 1930

Inventor
Albert Dreyer
by his Attorney

Patented Mar. 27, 1934

1,952,239

UNITED STATES PATENT OFFICE 1,952,239

PROCESS AND APPARATUS FOR THE MANUFACTURE OF CORRUGATED TUBES

Albert Dreyer, Lucerne, Switzerland

Application January 10, 1930, Serial No. 419,847
In Germany January 18, 1929

7 Claims. (Cl. 153—73)

This invention relates to a process and an apparatus for the manufacture of corrugated tubes from plain tubes of thin metal, or of materials that can be worked in the same way as metal.

It is already known to produce the crests and grooves constituting the corrugations, by spirally rolling with the agency of wires and balls, and also by means of wires, and subsequently upsetting the portion of tube remaining between each pair of grooves. In such cases the work material is subjected to very heavy stressing in that each of the balls, and also the rolling wheels or the like, can only act jointly on the work at a single point, and the material consequently tends to elongate at that point. It therefore cannot flow during the treatment, because the other parts, which are not directly acted upon by the rolls or balls, are always considerably thicker and hence the material cannot follow the draft. Owing to this circumstance, the material is exposed to heavy elongation stresses when the rolling of the corrugations is effected by means of rolls or balls, with the result that irregularities are set up in the thickness of the walls, or the latter are weakened, a condition synonymous with reduced working life of the corrugated tubes manufactured in this manner.

Experience has shown that the stressing of the corrugated tube is greatest in the groove. It scarcely ever happens that a corrugated tube tears at the crest or flanks of the corrugations, but almost exclusively in the groove alone. Now, this is precisely the spot at which the material suffers through the rolling with wheels and balls, in the manufacture of the corrugated tube. That in this known process the material must undergo extensive elongation, is evident from the fact that, despite the relatively extensive corrugation, corrugated tubes as long as 4-4.5 meters can be made from plain tubes 6 meters long. Indeed, an increase of 5-10%, and more, of the original length of the tube is frequently set up in the first passes through the rolls. Moreover, a cross-section through such a corrugated tube reveals considerable weakening of the walls at the places where the balls or rolls have operated in rolling. This reduction in the thickness of the walls may attain even 50% of the original thickness, in some places. Although this elongation of the material enables a relatively high manufactured length of the corrugated tube to be obtained—which may, in itself, be regarded as an advantage—the resulting disadvantage, namely, the weakening of the walls of the corrugated tube in the most delicate places (bottom and crest of the corrugation) must nevertheless be considered as far outweighing the advantage.

The present invention successfully overcomes the defect of weakened walls.

An essential feature of the invention is that balls or rolls which are able to act on the material at one point only, or on a small fraction of the periphery of the tube, at a time, are replaced by an annular tool or profiled pressure ring which, given suitable contour, enables the plain tube, which is to be transformed into a corrugated tube, to be simultaneously acted upon over a far larger portion of its periphery. The corrugation grooves produced in this manner retain the same thickness as the original walls of the tube, or of the adjacent portions (flanks). The profiled pressure ring presses simultaneously on about 1/3rd of the periphery of the tube, and thereby enables a sufficient draft to be exerted on the material.

It is preferable to employ a profiled pressure ring mounted in a ball-bearing, so that, by rotating the outer race of the ball-bearing at the same time effecting a gradual radial displacement of said bearing towards the axis of the tube, the profiled pressure ring is rolled into the tube to form the groove of the corrugation. The tube which has been roughed out in this manner, can then be transformed into a finished corrugated tube, in known manner, by upsetting the slightly arched portions of the tube lying between the several grooves.

There is no need for the profiled pressure ring itself to revolve round the tube if the latter rotates, it being sufficient to displace it, eccentrically and in the radial direction of the tube axis, by means of the ball-bearing.

The feeding movement of the tube to be corrugated is preferably imparted by means of two rubber rollers (not shown) which grip the tube and are positively operated with the rolling-machine head, so that the moment the tube is released by the profiled pressure ring, it is advanced by the rubber rollers through such a distance that the place at which the next corrugation groove is to be formed, comes into alignment with the profiled pressure ring. At the same time, the rubber feed rollers prevent the tube from turning on its axis while the profiled pressure ring is operating.

A typical embodiment of an apparatus for carrying out the new process is illustrated on the accompanying drawing.

Figure 1:
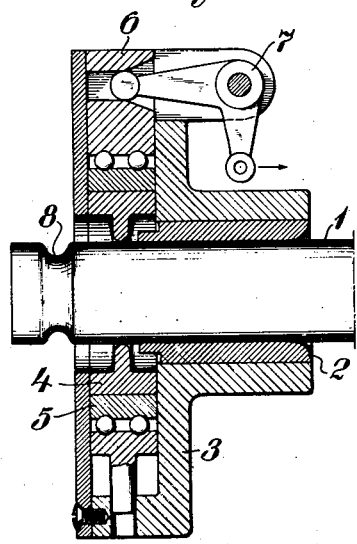
Fig. 1 represents a cross-section through the shaping head.
Figure 2:
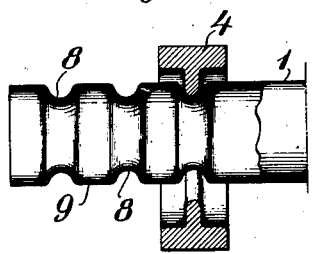
Fig. 2 shows the profiled pressure ring rolled into the tube, when in its deepest position.
Figure 3:
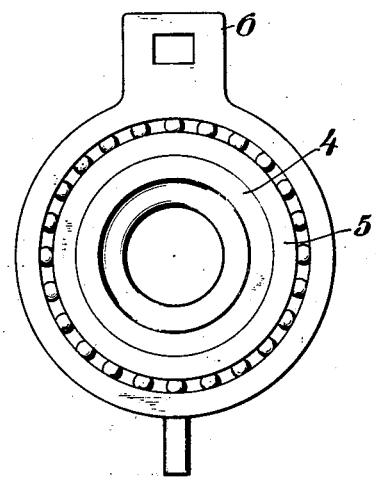
Fig. 3 is a front elevation of the ball-bearing, with the profiled pressure ring inserted.

Reference 1 denotes a thin-walled metal tube, slidably mounted in a guide bushing 2 on which the head 3 is set in rotation. 4 is the profiled pressure ring, which is securely mounted in the inner race 5 of a ball-bearing carried by said head, while 6 denotes a lug on the outer race of said ball-bearing, said lug being provided with a hole and pin for the pivotal mounting of a bell-crank lever 7. Moving the lever 7 in the direction of the arrow during the rotation of either the tube or the head 3 displaces the ball-bearing 5 radially in relation to the axis of the tube, and thus effects the rolling of the corrugation grooves 8 in the tube by the action of the profiled pressure ring 4. After each groove is formed, the tube is fed forward in the manner already stated and the pressure ring is again operated to form the next groove. The cylindrical portions 9 between the rolled corrugations are transformed into the crests of the corrugations by subsequent upsetting.

No drawings illustrating the manner of advancing the tube for the successive formation of the grooves, and the offsetting of the cylindrical portions 9, are deemed necessary because these steps can be readily understood from the description.

While one of the elements mentioned is caused to rotate, the other remains stationary; or else the tube 1 may be turned in one direction and the head 3 in the other.

By virtue of the arrangement described, no appreciable amount of friction develops between the pressure ring and the surface of the tube, since whatever friction there is is rolling friction and not sliding friction. In fact, since there is less frictional resistance developed between the outer and inner race of the ball bearing than between ring 4 and the tube, and since ring 4 is virtually part of the inner race, when the head is rotated the outer race only of the ball bearing will follow its rotation, whereas ring 4 and the inner race will be restrained against rotation by said frictional resistance.

Since crank lever 7 rotates together with the outer race, it follows that the point of application of the pressure, which is always in radial alignment with the ball end of crank lever 7, also rotates with respect to the inner race, so that the point of application of the pressure will, therefore, continuously be angularly displaced with respect to the axis and along the circumference of the tube.

By thus causing the point of application of the pressure to be continuously advanced along the circumference of the inner race of the ball bearing, ring 4 will be caused to roll over the tube, that is, its inner surface will be caused to develop over the surface of the tube, without any appreciable amount of sliding taking place between the two contacting surfaces. Consequently, in such a rolling action, as distinguished from a rotation where the rotating surface slides over the stationary surface, and sliding friction is, therefore, generated, no appreciable amount of friction will be developed, as will be understood; furthermore, the pressure is exerted over a relatively wide area and, therefore, no material thinning of the section against which the pressure is exerted will occur.

For this action to take place, the inner diameter of ring 4 is preferably greater than the diameter of the tube but even if its diameter were equal to that of the tube, the pressure exerted against ring 4 transversely of the axis of the tube would soon form a depression or slight circular groove around the tube, which would cause the inner diameter of ring 4 to soon be greater than the diameter of the tube at the point where its action takes place.

Although a ball bearing is to be preferred in every case, it is obvious that, except for the fact that rolling friction is developed instead of sliding friction, the action of a ball bearing is equivalent to that of an ordinary bearing of which one of the races represents the stationary element, while the other race represents the rotating element; always assuming, of course, that the frictional resistance to sliding developing between the inner element of the bearing and the tube be greater than the resistance developing between the inner and the outer element of said bearing. Accordingly, in the claims the term "bearing" is used to indicate either one of the elements of an ordinary bearing or one of the races (in this case the outer race) of the ball bearing used.

It will be observed that guide bushing 2 extends to a point quite close to the profiled portions of pressure ring 4 forming the grooves in the tube. By virtue of this arrangement, the tube becomes externally supported at a point in proximity of the groove being produced, and will thus remain quite rigid while the operation is performed. In practice, it is important that the tube be thus supported in order to prevent the possibility of its yielding under the action of the pressure exerted against it by the pressure ring and becoming bent as a result.

Figure 4:
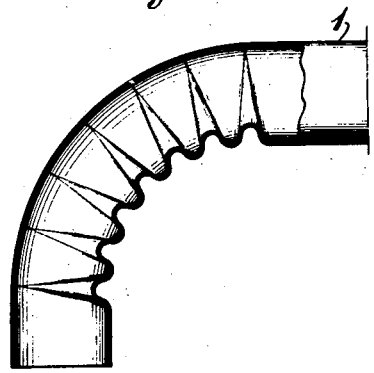
Fig. 4 shows a corrugated tube bend made in accordance with the invention.

Moreover, by eccentrically mounting the tube 1 in the head, eccentric grooves can be impressed in the tube, so as to leave the tube perfectly plain on one side, by which means bends with any radius of curvature can be produced, as shown in Fig. 4.

I claim:—

1. The method of producing a circumferential groove in a tube made of relatively thin material, which consists in pressing the inner surface of an annular profiled tool against the surface of the tube, while causing the point of contact between said tool and said tube to be continuously displaced along the circumference of said tube, and gradually displacing one of said elements transversely of the other so as to gradually increase the distance between their respective centers, while externally supporting the section of the tube adjacent the groove thus produced.

2. In a process of making a corrugated tube from a plain tube made of relatively thin material, the step which consists in forming each corrugation groove in the tube, by forcing against the tube the inner surface of an annular tool profiled to contact with the surface of the tube along an arc, and causing said tool to roll over the circumference of said tube, at the same time gradually displacing said tool in a substantially radial direction with respect to said tube, so as to gradually increase the distance between their relative centers, externally supporting the section of the tube adjacent the groove thus produced.

3. Apparatus for producing a circumferential groove in a plain tube made of relatively thin material, comprising a profiled pressure ring through which the tube may be inserted, a bearing within which said ring is rotatably mounted, and means for effecting eccentric displacements of said bearing with respect to said tube.

4. Apparatus for producing a circumferential groove in a plain tube made of relatively thin material, comprising a head bored for the passage of the tube, a bearing mounted in said head, a profiled pressure ring through which the tube may be inserted, rotatably mounted in said bearing, and means for effecting eccentric displacements of said bearing and ring with respect to said tube and head.

5. Apparatus for producing a circumferential groove in a plain tube made of relatively thin material, comprising a rotatable head bored for the passage of the tube, a bearing mounted in said head, a profiled pressure ring, through which the tube may be inserted, rotatably mounted in said bearing, and means for effecting eccentric displacements of said bearing and ring with respect to said tube and head.

6. Apparatus for producing a circumferential groove in a plain tube made of relatively thin material, comprising a rotatable head bored for the passage of the tube, a ball bearing slidably mounted in said head for displacement radially with respect to its bore, a profiled pressure ring in fixed relation with the inner race of the ball bearing, an apertured lug on the outer ball race, and a cranked lever pivoted on the head with one arm in engagement with said lug whereby the profiled ring can be displaced and caused to roll into the tube while the head is rotated.

7. Apparatus for producing a circumferential groove in a plain tube made of relatively thin material, comprising a rotatable head bored for the passage of the tube, a ball bearing slidably mounted in the head for radial displacement, a profiled pressure ring, through which the tube may be inserted, in fixed relation with the inner race of said ball bearing, and means whereby such displacement can be effected during rotation of the head.

ALBERT DREYER.